Nov. 27, 1962 F. KUGEL ETAL 3,065,652
ELECTRO-HYDRAULIC DRIVE, ESPECIALLY FOR RAIL VEHICLES
Filed April 27, 1959 2 Sheets-Sheet 1

INVENTORS:
Fritz Kugel
Helmut Möller
BY
Walter Behn
Patent Agent

Nov. 27, 1962    F. KUGEL ETAL    3,065,652
ELECTRO-HYDRAULIC DRIVE, ESPECIALLY FOR RAIL VEHICLES
Filed April 27, 1959    2 Sheets-Sheet 2

INVENTORS
Fritz Kugel
Helmut Möller
BY
Walter Becker
Patent Agent

United States Patent Office 3,065,652
Patented Nov. 27, 1962

3,065,652
ELECTRO-HYDRAULIC DRIVE, ESPECIALLY FOR RAIL VEHICLES
Fritz Kugel and Helmut Muller, Heidenheim (Brenz), Germany, assignors to J. M. Voith G.m.b.H., Heidenheim (Brenz), Germany
Filed Apr. 27, 1959, Ser. No. 809,223
Claims priority, application Germany Apr. 29, 1958
13 Claims. (Cl. 74—688)

The present invention relates to an electrohydraulic drive, especially for rail vehicles.

With electric locomotives and self-propelled cars receiving electric energy from a stationary trolley or contact wire through current taking means, the employment of polyphase alternating current of 50 cycles per second as is ordinarily available in industrial networks causes considerable difficulties. Therefore, in connection with electric railway operations, frequently special networks with lower frequency, mostly with 16⅔ or 25 cycles per second have been created and employed in order to be able to use as drive motors, commutator motors which, as is well known, can easily be controlled as to speed, and have a high output factor as well as a high starting torque. However, this special railway current is considerably more expensive than the ordinary network current. Moreover, with commutator motors, an electric braking is possible only by destroying energy by means of resistances, regenerative braking with feed-back into the network is not applicable. In addition thereto, commutator motors have the tendency to spark at the brushes which increases with the increase in the network frequency.

With another system used in particular abroad, the electric locomotives are provided with special rectifiers which transform ordinary 50 cycle polyphase alternating current into direct current, while variable direct current motors will then be employed. However, also with these systems, a regenerative braking is not possible.

Also, so-called transformer locomotives have been designed which comprise an electric motor of constant speed, a generator driven by said electric motor, and drive motors that receive current from the generator. While this last mentioned system makes possible a regenerative braking, it requires three electric machine units each of which has to be designed for full load, so that such a system is rather expensive and difficult.

There has also become known an electrohydraulic drive with an ordinary electric motor and a non-variable flow converter-hydrodynamic converter. A similar known vehicle drive comprises an electric motor without collector which is followed by a hydrodynamic transmission with fluid couplings and sometimes with a torque converter. With such a system, all fluid circuits respectively cooperate with other gear transmissions and can be made effective or ineffective by a complete filling or emptying respectively. While such drives are relatively simple and inexpensive, and depending on their design also comprise a wide velocity range, they have considerable drawbacks with regard to certain conditions of operation, especially as to the control thereof.

Thus, it is not possible at random to influence the driving output of said last mentioned vehicle drives when variable electric motors are employed. Instead, the torque converter always absorbs the full motor output while, with the fluid couplings, which can be merely engaged or disengaged, the absorption of power, in conformity with a certain law, is dependent on the required traction force, so that the power absorption can likewise not be controlled at random. Thus, for instance, with torque converter operation, a certain speed value has associated therewith a single traction force value only so that at low driving speed, only a high traction force can be obtained.

While this is desirable in order quickly to start, it is not desirable in other circumstances as, for instance, when switching in which instance a fine switching with low traction forces should be possible but is not possible with said last mentioned system. In other words, with such electrohydraulic drives, neither the driving output nor the driving speed, nor the traction force can be controlled freely in the desired manner, at random and in an infinitely fine manner.

It is, therefore, an object of the present invention to provide an electric drive which will make it possible to utilize with a 50 or 60 cycle polyphase alternating current available practically everywhere and at low cost, while on the other hand an ordinary cheap motor safe in operation may be employed and a good control of the driving output, high traction forces, economic degrees of efficiency and a regenerative braking at low cost will be possible.

It is another object of this invention to provide an electric drive of the above mentioned character with ordinary non-variable electric motors, especially short circuit rotor or induction motors.

It is another object of this invention to provide an electric drive as set forth in the preceding paragraphs which will be variable in a continuous manner from full load down to zero and vice versa.

Another object of this invention consists in the provision of an electric drive of the above outlined character, which will require relatively little space and will have a relatively low weight.

These and other objects and advantages of the invention will appear more clearly from the following specification in connection with the accompanying drawings, in which.

Figure 2:
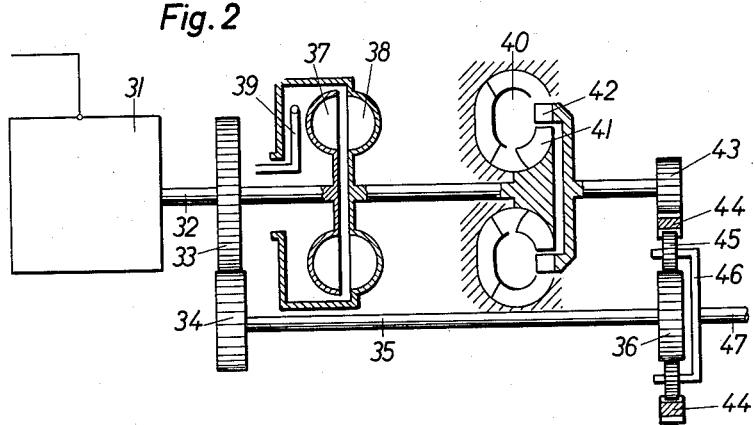
FIG. 2 shows a drive with an electric motor and a transmission comprising a torque converter velocity and a power collecting planetary gear transmission.
Figure 3:
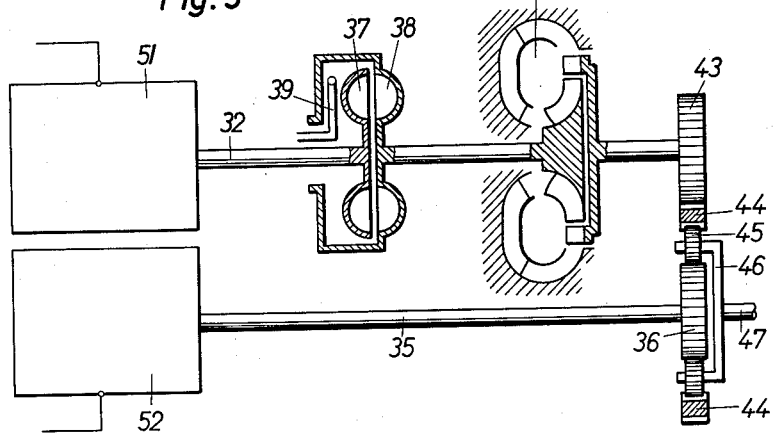

FIG. 3 diagrammatically illustrates a drive similar to that of FIG. 2 but differing therefrom by employing two electric motors.

Figure 4:
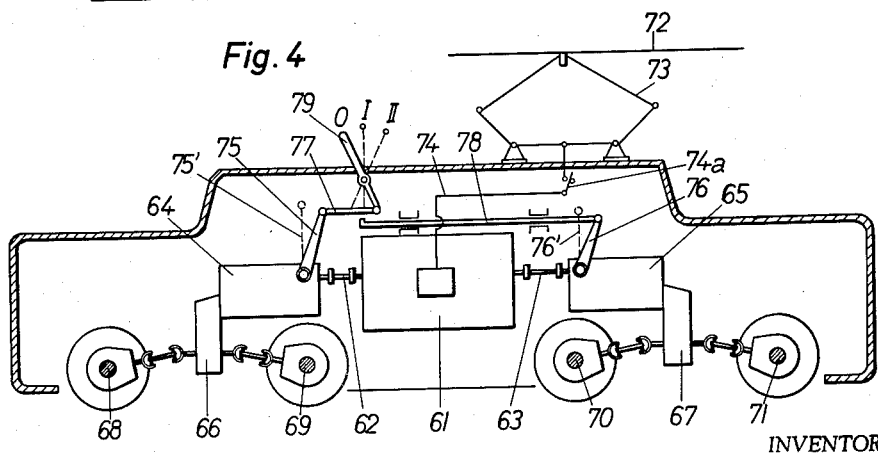

FIG. 4 diagrammatically illustrates a drive and control diagram for a locomotive with an induction motor which latter is operatively connected with a hydromechanical transmission at each end of said motor.

General Arrangement

The present invention is based on an arrangement as it is used with drives comprising variable internal combustion engines, in which the drive motor is followed by a hydromechanical transmission comprising a purely mechanical power path and a parallel hydraulic power path, while both power paths are, through the intervention of a planetary gear transmission, operatively connected with one of the two main shafts of the transmission, namely, with the input or output shaft thereof. In conformity with the present invention, as drive motors there are employed constant speed motors or motors which can be varied in speed only in coarse steps, while the hydraulic power path comprises at least one non-variable fluid converter and one variable fluid coupling preceding the fluid flow converter or converters.

The two power paths of the hydromechanical transmission may be operatively connected with the transmission input shaft through a power dividing planetary gear transmission preceding said two power paths. However, also another system will be possible according to which the two power paths cooperate with each other through a power collecting planetary gear transmission following said two power paths. With drives employing two electric motors, it is advantageous operatively to connect each motor directly with one but a different power path of the transmission. A "direct" operative driving connection is meant to include a driving connection through gear transmissions or the like if said direct operative connection is not effected through the subsequent power distributing transmission.

The desired adjustment of the power output is effected by the transmission in which the variable fluid coupling is adjusted for a certain slip whereby a certain torque input speed is ascertained. Depending on this input speed, the torque converter will absorb a corresponding power in conformity with the law $N = C \times n3$, in which N indicates the input power, while $n$ indicates the converter input speed, and C represents a constant value.

In view of the power distribution, the low degree of efficiency of the two serially arranged fluid flow circuits—fluid coupling and converter—has only a minor effect on the total degree of efficiency because a portion of the motor output is always conveyed at optimum degree of efficiency through the purely mechanical power path. In this connection it should be noted that this purely mechanically transmitted power portion is greatest in the most important upper velocity range percentagewise which likewise has a favorable effect on the total degree of efficiency, said upper velocity range also being the greatest one as to its duration.

In this connection, for purposes of completeness, reference may also be had to a heretofore known vehicle drive comprising a non-variable or constant speed electric motor followed by a variable hydrodynamic transmission. With this known system, however, each fluid flow circuit is variable by itself, whereas, according to the present invention, all velocity ranges can be varied in a stepless manner by means of a single control coupling. The other fluid flow circuits—torque converter—may therefore be of simplest design and be extremely reliable in construction. Furthermore, the torque converters employed with the last mentioned heretofore known drive do not permit a regenerative braking nor do they permit any power control at the starting point up to zero. Finally, variable converters for high outputs are rather difficult to design so that they will have small dimensions and are as safe in operation as variable fluid couplings.

According to a further development of the invention, the hydraulic power path of the transmission also includes a mechanical shift clutch which follows the fluid coupling and makes possible a shunting of the fluid coupling in order to obtain a further velocity range. In this way, there will not only be created a velocity range with a high degree of efficiency in the most important upper working range, but there will additionally be made possible a regenerative braking. It will be appreciated that the mechanical clutch as well as the fluid coupling will make possible a reversed power flow, namely from the driving wheels to the motor. The regenerative braking is of particular economic importance in railway operation because here a great portion of the driving energy is to be employed for lifting and accelerating work and therefore can partially be regained by braking while the not regainable work for overcoming the driving resistance will be relatively small. Furthermore, with this system the braking effect may be controlled at random by the control device of the fluid coupling.

The adjustment of the mechanical clutch will be facilitated by the fact that it has to convey merely a portion of the motor output. Moreover, the variable hydraulic coupling may be employed as synchronizing device for adjusting the mechanical clutch.

According to a further modification of the invention, pole changing electric motors, i.e. motors in which the numbers of pairs of poles can be changed, are employed so that the same can be switched, for instance, to half the ordinary speed. In this way, an efficient regenerative braking will be made possible which would otherwise have to be effected by a special brake velocity of a subsequent transmission. Moreover, with pole changing motors, when switching to a low motor speed, it is possible even at fully effective control coupling—maximum coupling degree of efficiency—to convey a low driving power at optimum hydraulic degree of efficiency. This is highly advantageous for switching operations.

With power distributing transmissions it is also advantageous so to design the starting torque converter velocity including the power distributing planetary gear transmission, that in starting condition, i.e. at a transmission output speed of zero or nearly zero, and when the fluid coupling is adjusted for full load, the transmission takes in the maximum output of the electric motor under which it can be operated for one hour without exceeding the upper temperature limit. When designing the starting velocity, also the dimensioning and designing of the vanes of the converter as well as the design of other gear transmissions of the velocity have to be considered. In this way the permissible temporary overload of the electric motor within safety limits will be fully exploited and a further increase in the traction forces will be obtained. Inasmuch as the overload during the starting period drops fast, in view of the influence of the planetary gear transmission, with increasing driving speed, there will exist no danger that the motor will be overloaded for any undue time.

The drive according to the present invention is of particular advantage for rail vehicles but can also be employed for stationary installations as, for instance, for deep drilling installations, winches and the like.

*Structural Arrangement*

Figure 1:
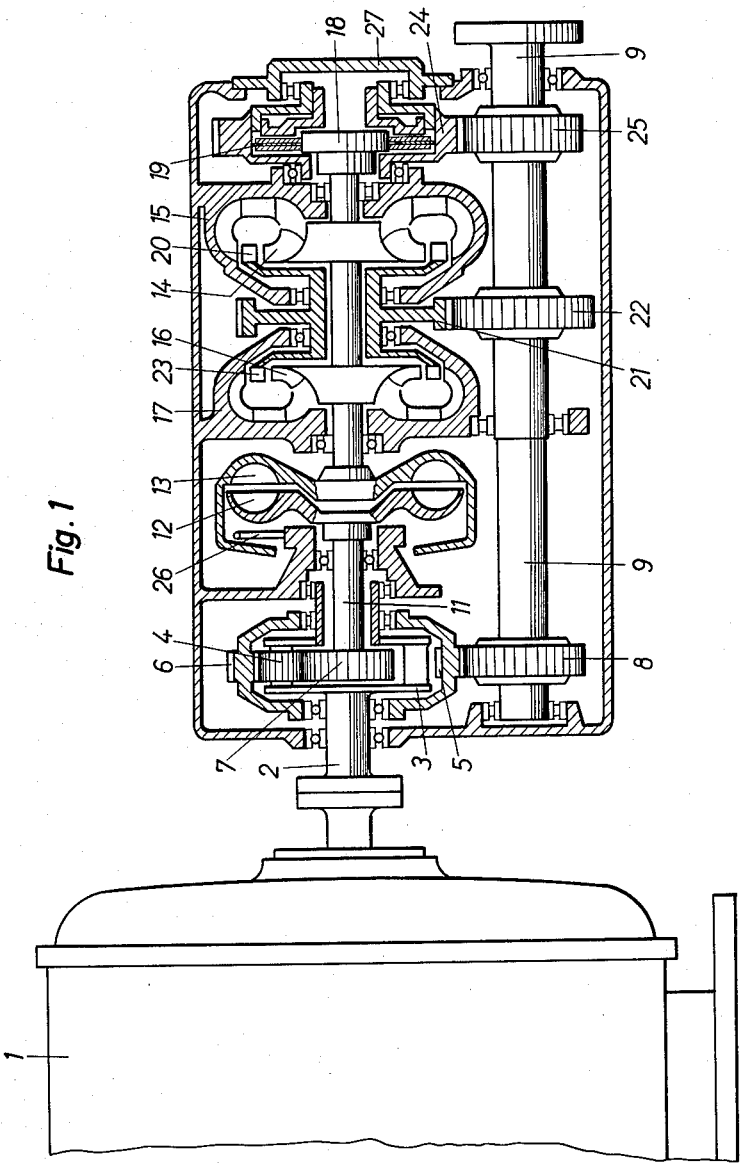
FIG. 1 shows partly in section a drive according to the present invention with a short circuit or induction motor and a hydromechanical transmission comprising two conveter velocities and a coupling velocity as well as a power distributing planetary gear transmission.

Referring now to the drawings in detail and FIG. 1 thereof in particular, the drive shown therein comprises a short-circuit rotor or induction motor with constant speed of operation which drives a planetary gear carrier 3 of a power dividing planetary gear transmission through the intervention of a transmission input shaft 2. The planetary gears 4 of planetary gear carrier 3 are operatively connected with the spur gear 8 of the transmission output shaft 9 through the inner gear ring 5 and the outer gear ring 6. This represents the mechanical power path of the transmission.

Furthermore, the planetary gears 4 through sun wheel 7 and connecting shaft 11 drive the pumping wheel 12 of a variable fluid coupling comprising a turbine wheel 13 rigidly connected with pumping wheel 14 of the starting converter 15, with pumping wheel 16 of converter 17 for the second velocity range, and with input element 18 of disc clutch 19 for the third velocity range. When starting converter 15 is filled, and converter 17 is empty, the hydraulic power path comprises the adjustable coupling 12, 13, pumping wheel 14 and turbine wheel 20 of converter 15 as well as the gear transmission 21, 22 and output shaft 9 (first converter velocity range). If the starting converter 15 has been emptied and the hydraulic converter 17, which has a different transmission ratio, is filled, the power of the hydraulic power path is conveyed through adjustable coupling 12, 13, pumping wheel 16, turbine wheel 23 of converter 17 and gear transmission 21, 22, and finally output shaft 9 (second torque converter velocity range). In the third and highest velocity range, both torque converters are empty, and disc clutch 19 is engaged so that the hydraulic power path is formed by the variable coupling 12, 13, the disc clutch 19 and the gear transmission 24, 25.

By turning or displacing the scoop 26, it will be possible steplessly to vary the filling of the coupling 12, 13 and thereby also the output speed thereof. Inasmuch as the output speed of the fluid coupling is simultaneously the input speed of the two converters 15 and 17, the adjustment of the scoop pipe 26 will at the same time change the input power of the converter and thereby the total power ptaken in by the transmission. Similar remarks apply to the third velocity range with engaged disc clutch 19.

The disc clutch 19 is arranged at the right hand end of the transmission and is easily accessible for control and repair after the housing lid 27 has been removed.

According to the modification shown in FIG. 2, the nonvariable or constant speed electric motor 31 through intermediate shaft 32, gear transmission 33, 34 and shaft 35, drives the sun wheel 36 of a power collecting planetary gear transmission (mechanical power path). The hydraulic power path will in this instance comprise the variable fluid coupling 37, 38, the torque converter 40 with pumping wheel 41, turbine wheel 42, and furthermore gear 43 as well as the outer and inner gear ring 44 of the power accumulating planetary gear transmission. The planetary gears 45 of said power collecting planetary gear transmission unite the two power paths and convey the transmission power to the planetary carrier 46 and the gear output shaft 47 rigidly connected to planetary gear carrier 46. This transmission will thus permit a torque velocity range only. The power adjustment is likewise effected by adjusting the scoop pipe 39 of the fluid coupling.

The drive illustrated in FIG. 3 is very similar to the drive of FIG. 2. According to FIG. 3, in which the elements corresponding to those of FIG. 2 are designated with the same reference numerals as in FIG. 2, each of the two transmission power paths is respectively directly operatively connected with an electric motor 51 and 52.

Inasmuch as the non-variable or constant speed electric motors to be employed in connection with the present invention are extremely safe in operation, an arrangement according to FIG. 4 is particularly favorable for locomotives, especially those of a high output. According to FIG. 4, a single strong and therefore favorable short-circuit rotor or induction motor 61 of a high degree of efficiency is arranged in the center of the locomotive. Said motor 61 drives from each end face thereof a hydromechanical power dividing transmission 64 and 65 respectively through connecting shafts 62, 63. These hydromechanical power dividing transmissions may be designed in conformity with that of FIG. 2. This arrangement of the motor reduces the inertia moment of the locomotive about its vertical axis to a minimum which is favorable with regard to driving through curves. The two transmissions 64, 65 are operatively connected with drive shafts 68-71 in a manner known per se through subsequent transmissions 66 and 67, diagrammatically indicated Cardan shaft and axle drives. The driving current is taken from the trolley or connecting wire 72 and conveyed to electric motors through the current taking means 73, conduits 74 and switch 74a.

The power input of transmission 64 may be varied by lever 75 which latter is connected with the scoop pipe 39 (see FIG. 2) in any convenient manner. Similarly, the power input of transmission 65 may be varied by shifting lever 76. Both levers 75 and 76 are connected through bars 77 and 78 to the driving lever 79 operable by the operator. These connecting bars or rods are so designed that when the driving lever 79 occupies its position zero, both transmission levers 75 and 76 will likewise occupy their ineffective position shown in full lines in the drawing. In the intermediate position I of the driving lever, merely lever 75 is turned into the dash line position 75′ in which transmission 64 takes in the full power, whereas lever 76 further remains in its starting position. Only after the driving lever 79 has been further turned, also driving lever 76 will be adjusted. The full load position 76′ of lever 76 corresponds to the full load position II of the driving lever 79.

The last mentioned design representing a further modification of the invention will thus assure that the second and if present also the third velocity range can be made effective only after the first, second etc. transmission has been adjusted to its full output. This increases the overall degree of efficiency because the hydrodynamic transmissions according to the present invention operate at full load with a better degree of efficiency than with partial load (high coupling slip at partial load). Thus, with the locomotive of FIG. 4, transmission 64 is within the operational range between half and full locomotive output, always fully engaged so that it will then work at maximum degree of efficiency, whereas only the second transmission 65 with its low proportion of the total power has to be adjusted downwardly to the corresponding partial output.

From the above, it will be evident that the main advantages of a drive according to the present invention may be summarized as follows:

*a.* The possibility to employ low cost, substantially, universally, obtainable 50 or 60 cycle polyphase alternating current;

*b.* The possibility of employing ordinary non-variable or constant speed and operation safe electric motors, especially short-circuit rotor or induction motors;

*c.* High initial traction forces brought about by the torque converter and the fact that the power division of the transmission will permit a motor overload during the starting phase;

*d.* High safety of operation of the transmission because of the employment of wear-free fluid flow circuits which have proved successful for maximum power outputs (non-variable converter, variable fluid coupling);

*e.* The possibility of adjusting from full load to zero in a step-free manner;

*f.* Requirement of little space and low weight of the hydrodynamic transmission, among other reasons, because of the power division and the absence of torsion oscillations;

*g.* A minimum of electric controls;

*h.* Favorable cooling conditions for the electric motors since the same are under load only at full speed;

*i.* Light motors in view of the possible high frequency of the network;

*j.* Freedom from a burning through of the windings of the electric motors is impossible even when starting under heavy load because the maximum motor load can be limited by a corresponding design of the converter;

*k.* Electric motors without collector and thus high operative voltages may be employed;

*l.* Low swaying danger and sensitivity over self-propelled vehicles with electric individual axle drive.

It is, of course, to be understood that the present invention is, by no means, limited to the particular constructions shown in the drawings but also comprises any modifications within the scope of the appended claims.

What we claim is:

1. In a hydromechanical drive system; electric drive motor means the speed of which cannot be varied more finely than in coarse steps, output shaft means for the drive system, input shaft means drivingly connected to said electric drive motor means for driving said system, a hydraulic power path comprising variable fluid coupling means and non-variable torque converter means arranged in series in the order named when looking in the direction of power flow through said hydraulic power path, said hydraulic power path being drivingly connected at one end to one of said shaft means, and a planetary gear transmission having a plurality of elements, one of said elements being drivingly connected to the other end of said hydraulic power path while a second of said elements is drivingly connected to said input shaft means and while a third of said elements drivingly connected to said output shaft means.

2. In a hydromechanical drive system; electric drive motor means the speed of which cannot be varied more finely than in coarse steps, output shaft means for the drive system, input shaft means drivingly connected to said electric drive motor means for driving said system, a hydraulic power path comprising variable fluid coupling means and non-variable torque converter means arranged in series in the order named when looking in the direction of power flow through said hydraulic power path, said hydraulic power path being drivingly connected at one end to said output shaft means, and a power dividing planetary gear transmission having a plurality of elements, one of said elements being drivingly connected to the other end of said hydraulic power path while a second of said elements is drivingly connected to said input shaft means and while a third of said elements is drivingly connected to said output shaft means.

3. In a hydromechanical drive system; electric drive motor means the speed of which cannot be varied more finely than in coarse steps, output shaft means for the drive system, input shaft means drivingly connected to said electric drive motor means for driving said system, a hydraulic power path comprising variable fluid coupling means and non-variable torque converter means arranged in series in the order named when looking in the direction of power flow through said hydraulic power path, said hydraulic power path being drivingly connected at one end to said input shaft means, and a power collecting planetary gear transmission having a plurality of elements, one of said elements being drivingly connected to the other end of said hydraulic power path while a second of said elements is drivingly connected to said input shaft means and while a third of said elements is drivingly connected to said output shaft means.

4. A hydromechanical drive system according to claim 3, in which said input shaft means comprises a first shaft connected to said one end of said hydraulic power path and a second shaft connected to the said second of the said elements of said planetary gear transmission, and said first and second shafts being geared together and one thereof being connected to said electric drive motor means.

5. A hydromechanical drive system according to claim 3, in which said input shaft means comprises a first shaft connected to said one end of said hydraulic power path and a second shaft connected to the said second of the said elements of said planetary gear transmission, and said electric drive motor means comprising two electric drive motors, each of said motors being connected to a different one of said shafts.

6. In a hydromechanical drive system; electric drive motor means the speed of which cannot be varied more finely than in coarse steps, output shaft means for the drive system, input shaft means drivingly connected to said electric drive motor means for driving said system, a hydraulic power path comprising variable fluid coupling means and non-variable torque converter means arranged in series in the order named when looking in the direction of power flow through said hydraulic power path, said hydraulic power path being drivingly connected at one end to one of said shaft means, and a planetary gear transmission having a plurality of elements, one of said elements being drivingly connected to the other end of said hydraulic power path while a second of said elements is drivingly connected to said input shaft means and while a third of said elements is drivingly connected to the output side of said torque converter means, and means for bridging said torque converter means comprising a mechanical shiftable clutch operatively interposed between the output side of said fluid coupling means and said output shaft means and engageable for effecting a direct driving connection between the output side of said fluid coupling means and said output shaft means.

7. In a hydromechanical drive system; electric drive motor means the speed of which cannot be varied more finely than in coarse steps, output shaft means for the drive system, input shaft means drivingly connected to said electric drive motor means for driving said system, a hydraulic power path comprising variable fluid coupling means and non-variable torque converter means arranged in series in the order named when looking in the direction of power flow through said hydraulic power path, said hydraulic power path being drivingly connected at one end to said output shaft means, and a power dividing planetary gear transmission having a plurality of elements one of said elements being drivingly connected to the other end of said hydraulic power path while a second of said elements is drivingly connected to said input shaft means and while a third of said elements is drivingly connected to said output shaft means, a mechanical shiftable clutch having a first element connected to the output side of said fluid coupling means, said clutch also having a second element, and gearing connecting said second clutch element with said output shaft means, said clutch being engageable to bridge said torque converter means and to provide a direct driving connection between the output side of said fluid coupling means and said output shaft means.

8. A hydromechanical drive system according to claim 6, in which there is a housing enclosing the drive system and said mechanical shiftable clutch is located inside one end wall of the housing so as to be readily accessible from outside the housing.

9. A hydromechanical drive system according to claim 7, in which there is a housing enclosing the drive system and said mechanical shiftable clutch is located inside one end wall of the housing so as to be readily accessible from outside the housing.

10. In a hydromechanical drive system: electric drive motor means, the speed of which cannot be varied more finely than in coarse steps, input shaft means drivingly connected to said electric drive motor means, output shaft means, a hydraulic power path comprising a variable fluid coupling and two non-variable torque converters following said coupling in the direction of power flow through said hydraulic power path, said torque converters having their pumping wheels rigidly interconnected with each other and with the turbine wheel of the fluid coupling, the turbine wheels of said torque converters also being rigidly interconnected whereby the torque converters can be made selectively effective by selection filling thereof, a planetary gear transmission comprising one element drivingly connected to said input shaft means and a second element drivingly connected to said output shaft means, said planetary gear transmission also including a third element, and means drivingly connecting one end of said hydraulic power path to one of said shaft means and connecting the other end of said hydraulic power path to said third element of said planetary gear transmission.

11. In a hydromechanical drive system: an electric drive motor the speed of which cannot be varied more finely than in coarse steps, an input shaft drivingly connected to said electric motor, an output shaft, a hydraulic power path comprising a variable fluid coupling and two nonvariable torque converters following said coupling in the direction of power flow through said hydraulic power path, said torque converters having their pumping wheels rigidly connected to each other and to the turbine wheel of said fluid coupling, the turbine wheels of said torque converters also being rigidly interconnected whereby said torque converters may selectively be made effective by selectively filling the same, a power dividing planetary gear transmission comprising a first element drivingly connected to said input shaft and a second element drivingly connected to said output shaft, said planetary gear transmission also comprising a third element drivingly connected to one end of said hydraulic power path, the other end of said hydraulic power path being drivingly connected to said output shaft, a mechanical shiftable clutch having one element connected to the output side of said fluid coupling, said clutch also having another element, and gear means drivingly connecting said other clutch element with said output shaft, said clutch being operable to bridge said torque converters and to provide a direct driving connection between the output side of said fluid coupling and said output shaft.

12. In a drive system, especially for rail vehicles: electric drive motor means the speed of which cannot be adjusted more finely than in coarse steps, two hydromechanical drive systems respectively drivingly connected to said electric motor means to receive power therefrom, each of said hydromechanical drive systems comprising input shaft means drivingly connected to said electric motor means and also comprising output shaft means, each system including a hydraulic power path between the input shaft means and the output shaft means and comprising variable fluid coupling means and non-variable torque converter means in series in the direction of power flow through the drive systems, each said hydraulic power paths being drivingly connected at one end to one of the pertaining said shaft means, each system including a planetary gear transmission having a plurality of elements, one of said elements being drivingly connected to the other end of the said hydraulic power path of the pertaining system while a second of said elements is drivingly connected to the said input shaft means of the pertaining system and while a third of said elements is drivingly connected to the said output shaft means of the pertaining system, a said output shaft means being adapted for driving connection with the wheels of a rail vehicle, and control means operatively connected with said hydromechanical drive systems and operable to prevent each higher velocity range from becoming effective prior to the respective preceding velocity range having been adjusted for full load.

13. In a drive system, especially for rail vehicles: electric drive motor means the speed of which cannot be adjusted more finely than in coarse steps, two hydromechanical drive systems respectively drivingly connected to said electric motor means to receive power therefrom, each of said hydromechanical drive systems comprising input shaft means drivingly connected to said electric motor means and also comprising output shaft means, each system including a hydraulic power path between the input shaft means and the output shaft means and comprising variable fluid coupling means and non-variable torque converter means in series in the direction of power flow through the drive systems, each said hydraulic power paths being drivingly connected at one end to one of the pertaining said shaft means, each system including a planetary gear transmission having a plurality of elements, one of said elements being drivingly connected to the other end of the said hydraulic power path of the pertaining system while a second of said elements is drivingly connected to the said input shaft means of the pertaining system and while a third of said elements is drivingly connected to the said output shaft means of the pertaining system, the said torque converter means and the planetary gear transmission of each system being so designed that in the starting velocity range and with said fluid coupling means under full load said hydromechanical drive systems will take up power at the maximum rate, said electric drive motor means being able to produce power for one hour without becoming overheated.

References Cited in the file of this patent
UNITED STATES PATENTS

| | | |
|---|---|---|
| 2,147,528 | Fottinger | Feb. 14, 1939 |
| 2,213,349 | Seibold | Sept. 3, 1940 |
| 2,344,656 | Swennes | Mar. 21, 1944 |
| 2,368,873 | Pollard | Feb. 6, 1945 |
| 2,511,039 | Black et al. | June 13, 1950 |
| 2,627,764 | Mayner | Feb. 10, 1953 |
| 2,687,657 | Kugel et al. | Aug. 31, 1954 |
| 2,851,906 | De Lorean | Sept. 16, 1958 |